United States Patent Office 3,436,645
Patented Apr. 1, 1969

3,436,645
FIRING CIRCUIT FOR CONTROLLED ELECTRONIC VALVES IN THE LINES OF A POLYPHASE SYSTEM
Frederick O. Johnson, Pitcairn, and John Rosa, Pittsburgh, Pa., assignors to Westinghouse Electric Corporation, Pittsburgh, Pa., a corporation of Pennsylvania
Filed July 19, 1966, Ser. No. 566,270
Int. Cl. G05f 5/00
U.S. Cl. 323—24                    9 Claims

ABSTRACT OF THE DISCLOSURE

A firing circuit for controlled switching devices of the type which are normally nonconductive in one direction but may be rendered bidirectionally conductive by the application of firing signals to the control electrodes thereof. A device of the described type, or a plurality of devices to provide the same function, is connected in each phase of the polyphase system. The control electrode of the switching devices is connected to a different arm of a star network, which may be formed from diodes, whose common point is connected through a control switching arrangement to the common point of a second star network, which may comprise diodes, whose arms are connected to the source side of the respective ones of the polyphase lines.

---

This invention relates to firing (gating) circuits for controllable electronic valves operating in the switching mode, and more particularly to firing circuits for controlling such valves in a polyphase system wherein each phase line has in series a current control unit having a control terminal, and which unit is normally non-conductive in at least one direction but is abruptly rendered bidirectionally conductive in response to the application of a control signal to its control terminal. Each control unit, may, for example, be a back-to-back connected diode-controlled electronic valve pair (a controlled electronic valve shunted by an oppositely poled diode), or it may be a gated symmetrical (bilateral) switch such as a triac or other.

An object of the present invention is to provide a novel firing circuit for controllable electronic valves operating in the switching mode in the lines of a polyphase system.

Another object of the present invention is to provide such a firing circuit which receives energy from the lines of the polyphase system.

A further object of the invention is to provide a firing circuit for gated current control units in the lines of a polyphase system, the control units being of a type which are normally non-conductive in at least one direction, and are rendered bidirectionally conductive in response to a gate signal; a still further object being a firing system of this type which obtains energy from the phase lines of the system.

In accordance with one embodiment of the invention each phase line of a polyphase system includes a current control unit of the general character described, and the control terminal of each current control unit is connected to a different arm of a star network of diodes, the common point of the star being returned through a switch to a point common to all the phase lines in the system, and the diode in each arm of the star being poled to pass current into the control terminal connected thereto. The current control units are gated by closing the switch.

Other and further objects and advantages of the invention will become apparent from the following detailed description taken in connection with the drawings wherein a preferred form of the invention with variations thereof is illustrated.

Figure 1:
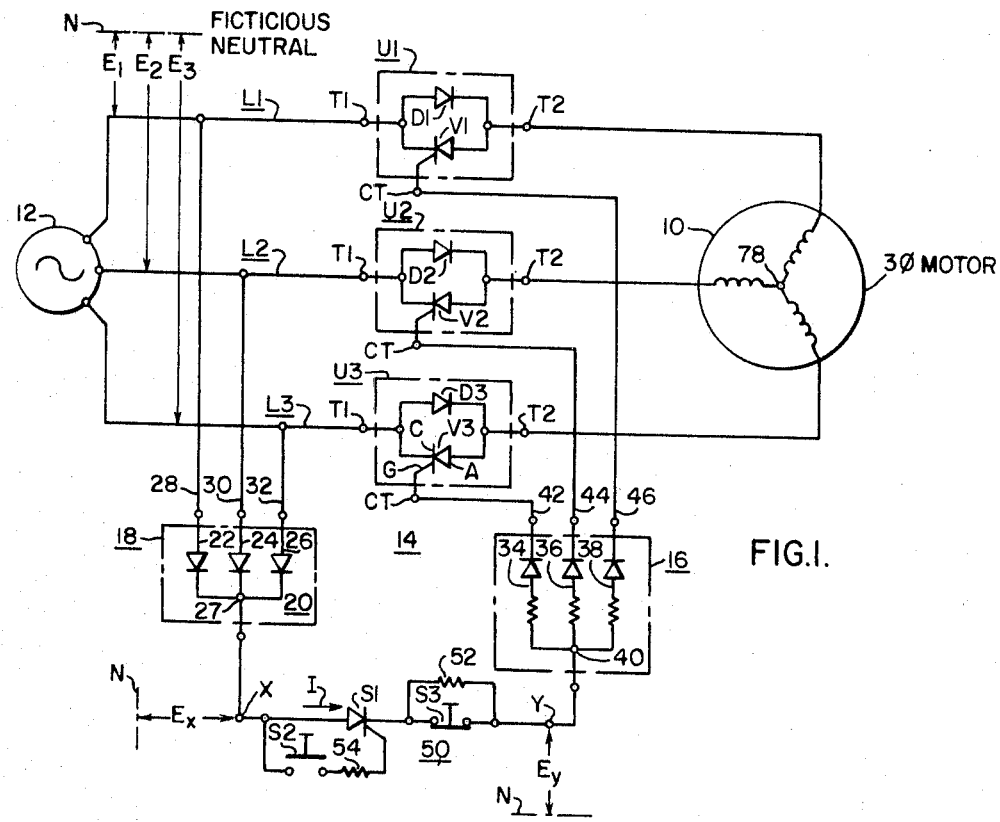
FIG. 1 is a schematic diagram of a three-phase controlled system embodying the invention.
Figure 6:
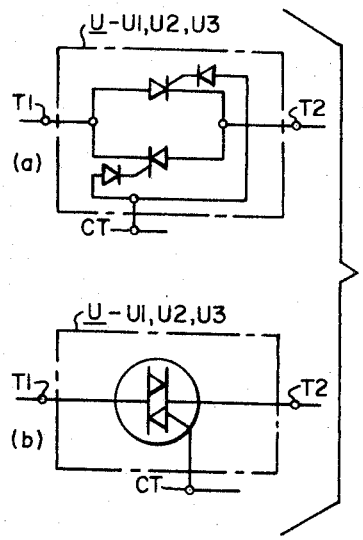
Figure 7:
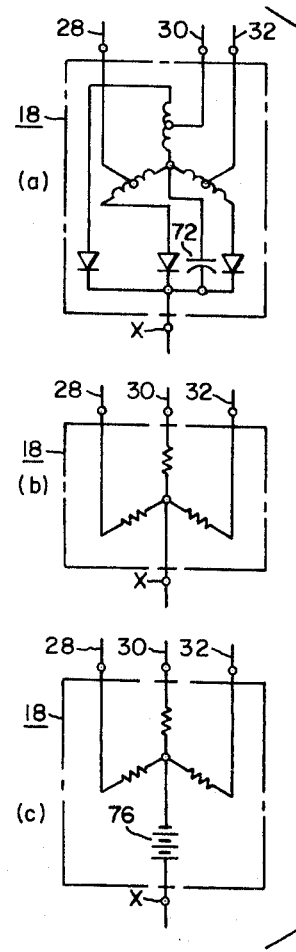

FIGS. 6(a) and 6(b) are diagrams, respectively, of control units which may be substituted for the control units of FIG. 1; and FIGS. 7(a), 7(b) and 7(c) are schematic diagrams, respectively, which may be substituted for the circuit segments 18 of FIG. 1.

Referring now to FIG. 1, there is shown a three-phase load 10 for example, a star connected motor field, supplied with power through phase lines L1, L2 and L3 from a three-phase source of alternating current 12. Each phase line has in series therein a current control unit U having main power terminals T1 and T2 and a control terminal CT. The respective current control units U in lines L1, L2 and L3 are labeled U1, U2 and U3. Each control unit U1, U2 and U3 is characterized in that it is normally non-conductive in at least one direction but may be abruptly rendered bidirectionally conductive in response to the application of a control signal to its control terminal.

By way of example each unit U in FIG. 1 is shown as a back-to-back asymmetric device-controlled electronic wave pair, i.e., a controlled electronic valve V shunted by a reversely poled asymmetric device D (for example a solid state uncontrolled diode). The diodes D in units U1, U2 and U3 are indicated at D1, D2 and D3 respectively, while the valves V for these units are referenced at V1, V2 and V3. The back-to-back or oppositely poled relation of the asymmetric device controlled valve pair in each phase line may also be referred to as an anti-parallel connection of these two elements. For example in line L1, valve V1 may be said to be shunted in antiparallel by the asymmetric device D1.

Valves V1, V2 and V3 may be example be controlled rectifiers such as thyratrons, thyristors, etc. It may be noted that "thyristor" is an accepted term for solid state PNPN switches also known as solid state controlled rectifiers. A popular example of a solid state controlled rectifier is a silicon controlled rectifier.

Each of the controlled valves V1, V2 and V3 is provided with a main current inlet electrode (anode) A, a main current outlet electrode (cathode) C, and a control electrode (gate) G. Each of the valves has an internal power (main) current path extending from one to the other of the power electrodes A and C. In connection with controlled rectifiers, the power inlet, power outlet, and control electrodes are respectively referred to as the anode, cathode and gate, and the power current path is referred to as the anode-cathode path. In FIG. 1, valves V1, V2 and V3 are shown by way of example as thyristors. It may be noted that the cathodes of the valves V1, V2 and V3 are connected to the source side of lines L1, L2 and L3 while the anodes A of these valves are connected to the load side of lines L1, L2 and L3. The "source side" of lines L1, L2 and L3 means the portions of these lines between the source 12 and the valves, and the "load side" of lines L1, L2 and L3 means that portion of these lines between the load 10 and the valves.

Valves V1, V2 and V3 are rendered abruptly conductive (gated) at appropriate times by a firing circuit 14, which in FIG. 1 is energized from the phase lines L1, L2 and L3. When a valve V is rendered conductive, its parent control unit U is abruptly rendered bidirectionally conductive.

The firing circuit 14 includes a star network 16 of asymmetric devices (for example solid state diodes), whose respective arms are each connected to the controlled terminal CT of a different one of the units U, and whose common point is returned to all the phase lines (L1, L2 and L3) by connecting it through a switch S1 to a point common to all the phase lines of the system.

In the example of FIG. 1, a point common to all phases of the system is formed in a segment 18 of the return path to the phase lines. The FIG. 1 example of the arrangement in the circuit segment 18 is a star network of asymmetric devices (for example solid state diodes) whose arms 22, 24 and 26 each containing a diode are respectively connected to the source side of phase lines L1, L2 and L3 through conductors 28, 30 and 32.

Referring again to the star network of diodes 16 in a more specific sense, it includes arms 34, 36 and 38 each having in series therein a diode and an impedance element for example a resistor as shown. One end of each arm is connected to the controlled electrode CT of a different one of the controlled units U while the other ends of the arms are connected together to form the common point 40 of the star network, which point is connected to a circuit point Y. More specifically, the current outlet terminal (cathode) of the diode in each arm of the star network 16 is connected to the control terminal CT of a different one of a controlled unit U. Thus, the cathode of the diode in arm 34 is connected through a line 42 to the control terminal CT of control unit U3, while the cathodes of the diodes in arms 36 and 38 are connected through lines 44 and 46 to the control terminals CT of control units U2 and U1. The common point 40 of the star 16 is connected through the resistors shown to the current inlet terminals (anodes) of the diodes in the respective arms of the star 16. With the above described orientation, the diodes in the star network 16 are poled to pass current into the controlled terminals CT of the controlled units U.

The current outlet electrodes (cathodes) of the diodes in the arms of the star network 20 (in circuit segment 18) are connected to the common point 27 which is connected to a circuit point X.

Connected between circuit points X and Y is a switching arrangement 50 for connecting and disconnecting point Y to point X at will. The switching arrangement 50 includes a main switch S1, a start switch S2 for turning on the main switch for conductance therethrough, and a stop switch S3 for substantially opening the circuit and deactivating the main switch S1. By way of example switch S1 is shown as a solid state controlled rectifier whose anode is connected to point X and whose cathode is connected to point Y through switch S3. A high resistance 52 is connected across switch S3 for arc prevention. Normally open switch S2 is connected to the gate of main switch S1 and to point X through a current limiting resistor 54.

Figure 2:
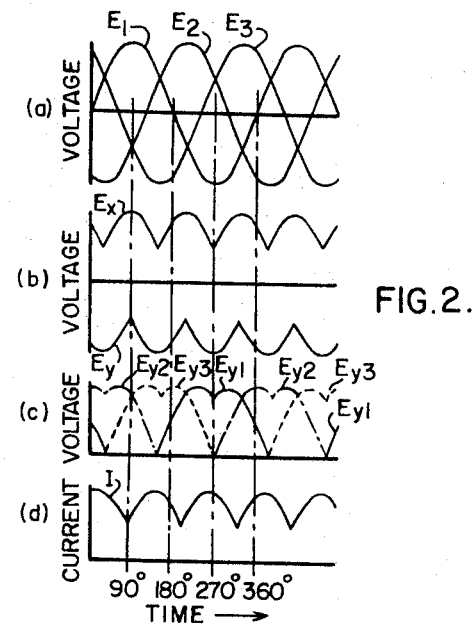
FIG. 2 is a group of waveforms helpful in understanding the operation of the searcher in FIG. 1.

The operation of the system in FIG. 1 may be explained as follows with the help of the waveform S shown in FIG. 2. Although the system in FIG. 1 is not shown as a three-phase four wire system, it is nevertheless proper to consider the phase lines as having line-to-neutral voltage values with respect to an artificial or fictitious neutral. The line-to-neutral voltages of lines L1, L2 and L3 are referred to herein as $E_1$, $E_2$ and $E_3$, respectively. It may also be noted that the voltages at points X and Y with respect to neutral are referred to as $E_x$ and $E_y$. Waveforms of the voltages $E_1$, $E_2$ and $E_3$ are shown in FIG. 2(a). The three-phase rectification produced by the star network of diodes 20 produces at point X the voltage waveform $E_x$ shown in FIG. 2(b). With the switching network 50 open (switch S1 in the non-conducting state), the waveform of voltage $E_y$ at point Y will be as shown in FIG. 2(b). Under such conditions, the gates of the controlled valves V1, V2 and V3 are never forward biased since the instantaneous potentials of $E_1$, $E_2$ and $E_3$ are always equal to or greater than that of point Y. Thus, valves V1, V2 and V3 are in the non-conducting state, whereby the controlled units U1, U2 and U3 are not bidirectionally conductive, and no power can be delivered to the load 10.

When switch S2 is momentarily closed, the gate of switch S1 becomes forward biased rendering switch S1 conductive and making the potential at point Y essentially that of point X. Under this condition, the instantaneous potentials at point Y with respect to any of the voltages at the cathodes of valves V1, V2 and V3, are those indicated by the waveforms $E_{y1}$, $E_{y2}$ and $E_{y3}$, respectively, in FIG. 2(c). $E_{y1}$ is voltage at Y related to valve V1, $E_{y2}$ is related to valve V2, and $E_{y3}$ is related to valve V3. From the waveforms in FIG. 2(c) it is seen that each of the voltages $E_{y1}$, $E_{y2}$ and $E_{y3}$ is a positive pulse of 240° length recurring at the frequency of the supply voltage. Thus the control electrode G of each valve V is forward biased for 240° of each cycle and therefore may be turned "on" at any time during this period. Thus the valves V1, V2 and V3 will appropriately fire to provide continuous line current for load current within the range of 30° leading to 210° lagging with respect to the line voltage. Outside of this range the line current will be discontinuous but useful for some applications. It may be noted that this range may be modified by design choice of component parameters which would change for example the voltage value at point X. For instance the range may be narrowed by reducing the voltage at X, for example by adding voltage dropping devices between point X and lines L1, L2 and L3. It may be also noted that the capability of handling lagging currents between 90° and 180° corresponds to regeneration of power from the load to the line.

The behavior of the firing circuit 14 being the same with respect to each of the phase lines L1, L2 and L3 and their respective associated current control units U, the operation of the firing circuit 14 with switch S1 closed (conducting) may be understood by considering the circuit operation in connection with one of the phase lines for example L1. As long as the voltage $E_1$ coincides with the voltage $E_x$, no current will flow through the resistor of the star network arm 38 connected to the control terminal of the control unit U1. At any other time voltage $E_1$ will be more negative than voltage $E_x$, and the arm 38 will conduct current into the control terminal CT of control unit U1 and thereby into the gate of valve V1. With respect to line L1, the instantaneous potential at point Y is that shown at $E_{y1}$ in FIG. 2(c). Thus the control electrode G of valve V1 is positive and consequently forward biased over a period coextensive with the $E_{y1}$ curve in FIG. 2(c). It follows that V1 may be turned "on" at any time during this period. Thus with switch S1 conducting, valve V1 will fire at some time (depending on load power factor) within the span of the curve $E_{y1}$ in FIG. 2(c).

The action of the firing circuit 14 with respect to lines L2 and L3 is the same as the above-described action relative to line L1. With switch S1 conducting the instantaneous voltages at point Y with respect to the cathodes of valves V2 and V3 (lines L2 and L3) are shown at $E_{y2}$ and $E_{y3}$ respectively. The waveforms $E_{y1}$, $E_{y2}$ and $E_{y3}$ are 120° apart.

From the description herein, it is seen that when switch S1 is in the conductive state, power is supplied from the source 12 to the load 10. The current flowing through switch S1 when conducting is shown at I in FIG. 2(d). When it is desired to shut this power off, switch S3 is opened momentarily thereby dropping the current through switch S1 below the holding value. As a result, the system will return to a nonconducting state and no power will be delivered to the load.

Figure 3:
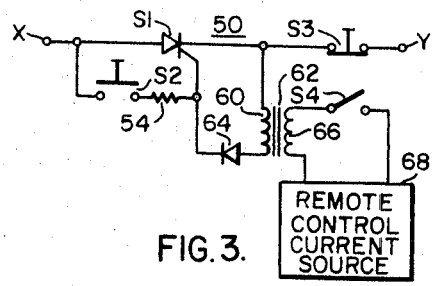
FIGS. 3, 4 and 5 are schematic diagrams, respectively, of switching arrangements that may be used between the points X and Y of FIG. 1.

By substituting the circuit in FIG. 3 for the portion between points X and Y in FIG. 1, a remote controlled circuit may be added to the gate bias circuit of switch S1. In FIG. 3, the secondary 60 of a transformer 62 is connected across the gate cathode junction of switch S1 through a protective diode 64. The primary 66 of transformer 62 is connected to a remote current source 68 through a normally open pushbutton switch S4 when this switch is closed. The current source 68 supplies a pulse of sufficient magnitude and duration to gate switch S1, i.e. render it conductive, and thus enable power flow to the load.

Figure 4:
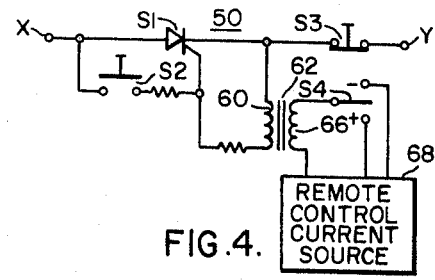

The scheme in FIG. 3 is not reversible. However, in FIG. 4 there is shown a reversible (on-off at will) remote control circuit. Again the circuit of FIG. 4 is substituted for the circuit portion between points X and Y in FIG. 1. The circuit of FIG. 4 is generally similar to the circuit of FIG. 3 except that in FIG. 4 the switch S1 is a gate-controlled thyristor (also known as a turn-off thyristor). This component offers more versatile control, since a negative pulse on the gate will switch it from the conducting state to the non-conducting state. In FIG. 4, a positive pulse of current in the primary 66 will turn switch S1 on whereas a negative pulse of current in primary 66 will turn switch S1 off. Thus the circuit of FIG. 4 offers remote "turn on" and "turn off" capabilities, thereby providing complete remote control of the power through the load.

Figure 5:
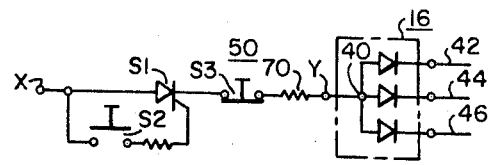

In FIG. 1, the resistors in the arms 34, 36 and 38 of the star network 16 need to be fairly high power resistors. These resistors may be replaced by a single resistor 70 as in FIG. 5. The circuit in FIG. 5 is substituted for the circuit portion between point X and lines 42, 44 and 46 in FIG. 1. However, a certain amount of performance is sacrificed. With the arrangement shown in FIG. 5, the potential at point Y follows the most negative of the voltages $E_1$, $E_2$ and $E_3$, whereby each of the valves V1, V2 and V3 can change from the non-conducting state to the conducting state only during the period between 210° and 330° of the cycle, and the system can handle only loads for which the current lags the voltage by 30° to 150°. However, this capability is sufficient for many applications including the control of motors.

Each of the control units U1, U2 and U3, in FIG. 1 may be replaced by a symmetrical switch such as the back-to-back controlled rectifiers in FIG. 6(a) or the triac in FIG. 6(b). The symmetrical switches of FIG. 6 present no problem to the firing circuit 14 of FIG. 1 as long as the zero crossings of the load current waves for lines L1, L2 and L3 fall within the span of waveforms $E_{y1}$, $E_{y2}$ and $E_{y3}$, respectively. While the span of the respective waveforms $E_{y1}$, $E_{y2}$ and $E_{y3}$ are adequate for substantially high power factor loads, these spans may be increased by increasing the DC voltage component at point X, for example by substituting the circuit of FIG. 7(a) for a circuit segment 18 in FIG. 1. In the circuit segment 18 of FIG. 7(a), a star network of diodes is powered through star connected autotransformers to increase the rectified voltage supplied to point X. A filter capacitor 72 in the circuit segment 18 of FIG. 7(a) by its sustaining action of the DC voltage enhances the ability of the system of FIG. 1 in handling lower power factor loads when symmetrical switches such as in FIG. 6 are employed.

The system of FIG. 1 may be modified by substituting for circuit segment 18, either of the versions of segment 18 shown in FIGS. 7(a), (b) and (c). FIG. 7(b) includes a star network of impedance elements shown as resistors and provides a narrower range of control. FIG. 7(c) includes a star network of impedance elements shown as resistors, with a battery 76 being connected between the common point of the resistors and the point X. In FIG. 7(c) the range of control depends on the value of the voltage of battery 76. It may be noted that the effect of the circuit of FIG. 7(b) can be substantially obtained when employing the particular current control units U shown in FIG. 1, by completely omitting segment 18 in FIG. 1 and connecting point X to the common point 78 of the load 10, if the load is a star load. If the power source 12 has an available neutral connection, the effects of the configurations in FIGS. 7(b) and (c) may be obtained by omitting the circuit segment 18 in FIG. 1 entirely and connecting point X to the neutral of the source either directly for the effect of FIG. 7(b), or through a battery for the effect of FIG. 7(c). It may be noted that an advantage of the FIG. 1 version of the circuit segment 18 over that in FIG. 7(c), is that no outside power supply such as the battery of FIG. 7(c) is required.

It should be noted that while the symmetrical switches U of FIG. 6 are normally non-conductive in both directions and are rendered bidirectionally conductive in response to a gating signal applied to their gate terminal, these characteristics are encompassed by the generic descriptive terminology of a "current control unit, which is normally non-conductive in at least one direction, and which is rendered bidirectionally conductive in response to a control signal applied to its control electrode."

From the description herein it is seen that the invention provides a simple and economical firing circuit for supplying control signals to current control units of the character described in the lines of a polyphase system.

It is to be understood that the hereindescribed arrangements are simply illustrative of the principles of the invention and that other embodiments and applications are within the spirit and scope of the invention.

We claim as our invention:
1. In a system for supplying $n$-phase power from an $n$-phase AC source to an $n$-phase load through $n$-phase lines, $n$ being a number corresponding to the number of phases of the system, each of said lines having in series therein a current control device having control terminal means and bidirectional capability but which device normally blocks in at least one direction and is abruptly rendered bidirectionally conducting in response to a control signal applied to said control terminal means, a control circuit for supplying control signals to the control terminal means of said current control devices comprising $n$ asymmetric current devices each having respective current inlet and current outlet electrodes, the current outlet electrode of each of said asymmetric devices being connected to the control terminal means of a different one of said current control devices, switch means, and second means including said switch means for connecting the current inlet electrodes of said asymmetric devices through said switch means to a point common to all the phases of the system.

2. The combination as in claim 1 wherein said second means includes a unidirectional voltage source connected between said switch means and a point common to all the phases of the system.

3. The combination of claim 1 which includes a star network having $n$ arms, each arm including translating means therein, means connecting one end of each arm to a different one of the phase lines, and means connecting the other ends of said arms together to provide said common point.

4. The combination as in claim 3 wherein said translating means in each arm includes an asymmetric device poled to pass current into said common point.

5. The combination as in claim 3 wherein said translating means in each arm includes an impedance element.

6. The combination as in claim 1 wherein each of said current control devices comprises a controlled electronic valve poled in the direction to pass current from said AC source to said load and an oppositely poled asymmetric device connected in parallel with said valve, said valve having a control electrode, said control terminal means comprising said control electrode.

7. The combination as in claim 1 wherein each of said current control devices comprises a symmetrical electronic switch having control electrode means, said control terminal means comprising said control electrode means.

8. In a system for supplying three phase power from a three phase source to a three phase load through three phase lines, one of said lines having in series a first controlled electronic valve shunted in anti-parallel by a first diode, a second of said lines having in series a second controlled electronic valve shunted in anti-parallel by a second diode, the third line having in series a third controlled electronic valve shunted in anti-parallel by a third diode, each of said controlled valves having respective anode, cathode and the anodes of said valves being connected to the load side of said phase lines, the combination therewith of a firing circuit for said controlled valves, said firing circuit comprising fourth, fifth, sixth, seventh, eighth and ninth diodes, each having respective cathode and anode electrodes, first and second junctions, means connecting the cathodes of said fourth, fifth and sixth diodes to said first junction, the anodes of each of the fourth, fifth and sixth diodes being connected to the source side of a different one of said phase lines, the cathode of each of the seventh, eighth and ninth diodes being connected to the control electrode of a different one of said first, second and third controlled valves, means for connecting the anodes of the seventh, eighth and ninth diodes to said second junction the cathode of said fourth controlled valve, and switch means for connecting said first and second junctions together.

9. The combination as in claim 8 wherein said switch means is a solid state device having first and second main electrodes and a control electrode, each main electrode being connected to a different one of said junctions, and means connected to the control electrode of said solid state device for controlling the conduction thereof.

References Cited

UNITED STATES PATENTS

| | | | |
|---|---|---|---|
| 2,722,649 | 11/1955 | Immel et al. | 318—227 X |
| 3,154,695 | 10/1964 | MacGregor et al. | |
| 3,189,810 | 6/1965 | MacGregor | 318—227 |
| 3,332,008 | 7/1967 | Mueller et al. | |

JOHN F. COUCH, *Primary Examiner.*

A. D. PELLINEN, *Assistant Examiner.*

U.S. Cl. X.R.

318—227